UNITED STATES PATENT OFFICE.

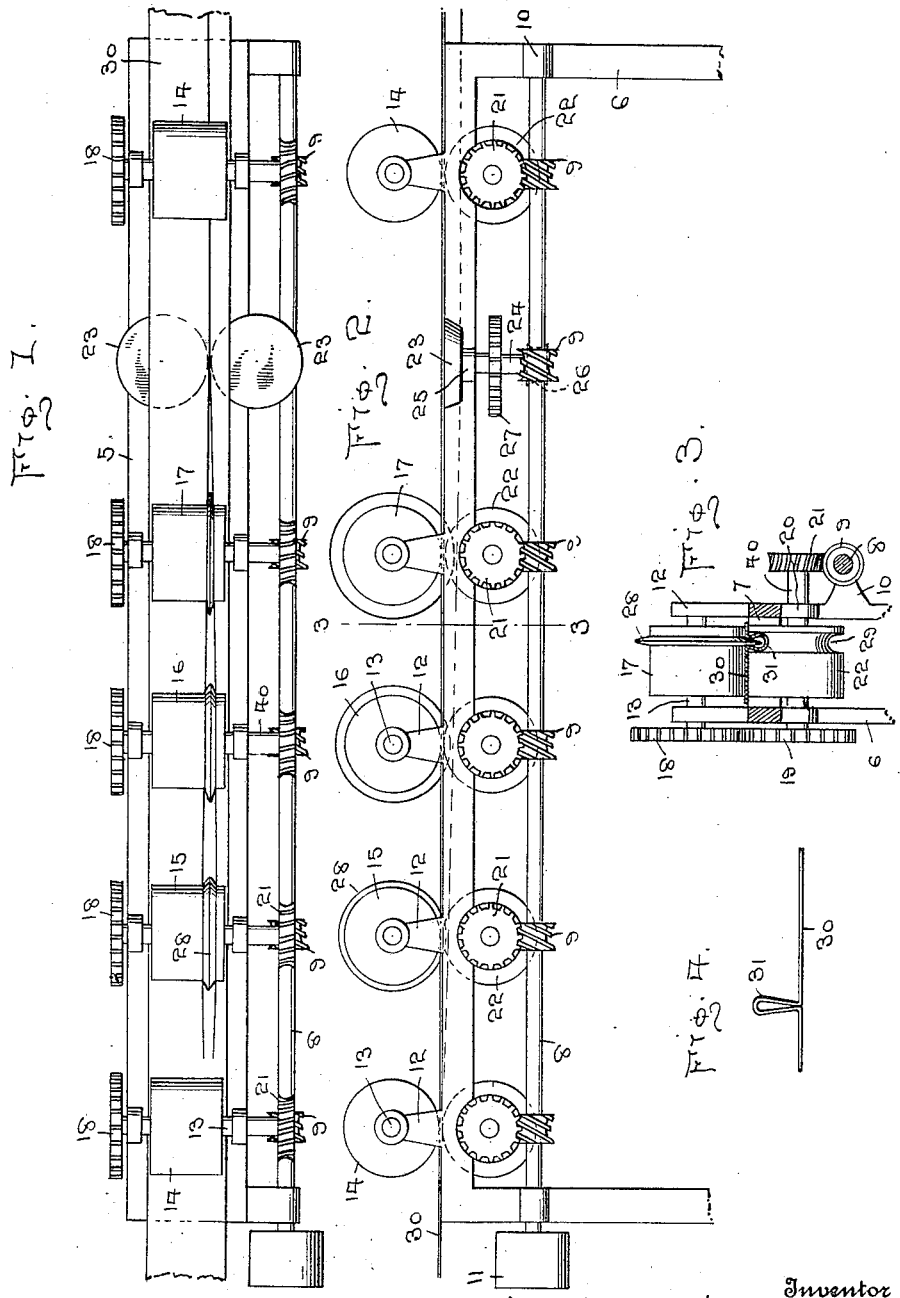

JOHN M. CROMLEY, OF YORK, PENNSYLVANIA.

ROLLING-MACHINE.

1,125,481.

Specification of Letters Patent.

Patented Jan. 19, 1915.

Application filed October 4, 1913. Serial No. 793,353.

*To all whom it may concern:*

Be it known that I, JOHN M. CROMLEY, a citizen of the United States, residing at York, in the county of York and State of Pennsylvania, have invented certain new and useful Improvements in Rolling-Machines; and I do hereby declare the following to be a full, clear, and exact description of the invention, such as will enable others skilled in the art to which it appertains to make and use the same.

This invention relates to rolling machines and one of the principal objects thereof is to provide a rolling machine for forming a specific type of metal weather stripping.

Another object is the provision of means for rolling out sections of weather stripping, whereby the length of a section is not limited, as is the case when the stripping is stamped, as is the ordinary custom.

A further object of the invention is the provision of a rolling machine which will be very simple, durable, efficient in operation and inexpensive to manufacture.

With these and other objects in view the invention resides in the construction, combination and arrangement of parts hereinafter more fully described and claimed, and illustrated in the accompanying drawings, in which like reference characters indicate like parts throughout the several figures, of which—

Figure 1 represents a top plan view of the machine in operation, Fig. 2 represents a side elevational view thereof, Fig. 3 represents a transverse sectional view taken on a vertical plane of the line 3—3 of Fig. 2, and, Fig. 4 represents an end elevational view of the completed weather strip.

Referring more particularly to the drawing, the numeral 5 indicates the parallel side bars of the machine which are supported at their ends by suitable legs 6 and which are connected at their ends by cross pieces 7. A shaft 8, which is provided at spaced intervals with worms 9, is journaled as at 10 on the legs 6, and said shaft is provided with a pulley 11 adapted to be driven from a suitable source of power (not shown). A plurality of brackets 12 extend upwardly from side bars 5 of the frame, said brackets being arranged in pairs throughout the length of the frame, and in each pair of brackets is journaled a short shaft 13, which carries a roller, the end rollers being designated by the numeral 14 and the intermediate rollers by the numerals 15, 16 and 17, respectively. The short horizontal shafts 13 carry gear wheels 18 which are in mesh with gear wheels 19 carried by shafts 40 in brackets 20 beneath the frame, said shafts 40 being provided with worm wheels 21, in mesh with worms 9, and said shafts 40 also carry under rollers 22 which are positioned directly beneath the upper rollers and in close proximity thereto.

Between the roller 17 and its adjacent roller 14, a pair of inverted frusto-conical disks 23 are supported in horizontal position on vertical shafts 24 journaled in brackets 25 on the frame, and one of said vertical shafts 24 is provided with a worm wheel 26 in mesh with one of the worms 9, and last said shaft is also provided with a gear wheel 27 meshing with a similar gear wheel on the opposite vertical shaft. It will be seen by this construction that as the shaft 8 revolves the upper and lower rollers will be driven in opposite directions, as will also the horizontal disks 23. Rollers 15, 16 and 17 are each provided near one end with a peripheral substantially V-shaped flange 28, the flanges on rollers 16 and 17 decreasing in thickness, but increasing in height from the flange on roller 15, and the under rollers 22 adjacent rollers 15, 16 and 17 are provided with annular concave grooves 29, in which the flanges are adapted to extend, said grooves being of a depth slightly greater than the width of the flanges, and being of a width somewhat greater than the thickness of the flanges, the grooves in the rollers beneath the rollers 16 and 17 being proportionally narrower and deeper than the groove in the roller 15, to conform with the proportions of the flanges on said rollers 16 and 17. The roller beneath the roller 14 (seen on left of Fig. 1) is plain as are also the rollers 14, but the roller beneath the opposite roller 14 is formed with a peripheral groove in alinement with the grooves in the rollers beneath the rollers 15, 16 and 17, and a strip of metal 30, from which a length of weather stripping is to be formed, is adapted to be inserted between the upper roller 14 at the left of Fig. 1, and its under roller, and as the rollers rotate the strip is fed between rollers 15, 16 and 17 and their under rollers and, as it passes between said rollers, the strip is formed with a corrugation 31, as illustrated in Fig. 3, said corrugation as it passes between the successive rollers being gradually deepened and made narrower, and as the strip passes beyond the roller 17 it is engaged between the horizontal disks 23, the edges of which are in close proximity, and the portions of the strip lying at each side of the corrugation are forced into close proximity, thus forming a section of weather stripping as illustrated in Fig. 4, which section may be cut transversely at a later time to form the desired length of weather stripping.

A roller 14 (shown on the right of Fig. 1), and its companion roller 22, which has a groove in it as previously described, function to roll the flanges of the corrugated strip after said corrugation has been closed by the disks 23 so that the flanges of the metallic strip will be flush with each other and will be approximately at right angles to the corrugation, thereby giving a finished and neat appearance to the weather strip.

Although I have described the preferred embodiment of my invention, I may desire to make such changes in the construction, combination and arrangement of parts as do not depart from the spirit of the invention and the scope of the appended claim.

Having thus fully described my invention, what I claim as new and desire to secure by Letters-Patent is,

A rolling machine to form a corrugated metallic weather strip comprising; a frame, a plurality of pairs of rollers journaled in juxtaposition thereon, flanges upon the upper roller of each of said pairs, said flanges decreasing in width and increasing in height in each successive pair, worm and worm-gear means to feed a metallic strip through said pairs of rollers and to operate said rollers, said metallic strip being corrugated as it is successively passed through each pair of rollers, a pair of juxtapositioned disks connected to and operated by said worm and worm-gear means to close the mouth of the corrugation, and means connected to and operated by said worm and worm-gear operating means to roll the flanges of the metallic strip, after it has been corrugated and the corrugation closed, so that the flanges will be flush with each other and approximately at right-angles to the corrugation.

In testimony whereof I have signed my name to this specification in the presence of two subscribing witnesses.

JOHN M. CROMLEY.

Witnesses:
  EDWARD J. LOUCKS,
  WM. F. FRANKLIN.

Copies of this patent may be obtained for five cents each, by addressing the "Commissioner of Patents, Washington, D. C."